United States Patent
Leben

(10) Patent No.: US 8,403,726 B2
(45) Date of Patent: Mar. 26, 2013

(54) SYSTEM AND METHOD FOR RESTORING WATER SUPPLY PIPES IN BUILDINGS

(75) Inventor: Marc Leben, Baden-Württemberg (DE)

(73) Assignee: Rikos Ltd., Toronto, Ontario (CA)

( * ) Notice: Subject to any disclaimer, the term of this patent is extended or adjusted under 35 U.S.C. 154(b) by 991 days.

(21) Appl. No.: 12/324,160

(22) Filed: Nov. 26, 2008

(65) Prior Publication Data

US 2010/0130109 A1    May 27, 2010

(51) Int. Cl.
*B24C 3/16* (2006.01)
(52) U.S. Cl. .......................................... 451/38; 451/76
(58) Field of Classification Search .................... 451/75, 451/76, 38, 39, 40
See application file for complete search history.

(56) References Cited

U.S. PATENT DOCUMENTS

| | | | |
|---|---|---|---|
| 1,892,093 A | 12/1932 | Battistella | |
| 2,087,694 A * | 7/1937 | Malmros | 451/37 |
| 2,331,824 A | 10/1943 | Buckingham | |
| 4,327,132 A * | 4/1982 | Shinno | 427/235 |
| 4,452,169 A * | 6/1984 | Matsuda | 118/50 |
| 5,007,461 A | 4/1991 | Naf | |
| 5,924,913 A * | 7/1999 | Reimelt | 451/36 |
| 5,950,681 A | 9/1999 | Reimelt | |
| 6,726,778 B2 | 4/2004 | Wang et al. | |
| 6,739,950 B1 * | 5/2004 | Kruse | 451/37 |
| 7,160,574 B1 | 1/2007 | Gillanders et al. | |

FOREIGN PATENT DOCUMENTS

| | | |
|---|---|---|
| CA | 2198103 | 12/2006 |
| EP | 0299134 A1 | 1/1989 |
| WO | WO95/09320 | 4/1995 |

* cited by examiner

*Primary Examiner* — Robert Rose
(74) *Attorney, Agent, or Firm* — Etienne de Villiers; Dimock Stratton LLP

(57) ABSTRACT

A system and method for restoring water supply pipes in buildings is provided. Compressed air is blown through one end of a cold water supply pipe, such as a cold water riser, and elsewhere on the pipe the cold water supply pipe is connected to the hot water supply pipe by an air hose. Compressed air may alternatively be blown through one end of the hot water supply pipe. To clean the pipe, abrasive particles are introduced into the stream of compressed air upstream of the section of pipe to be cleaned. To line the pipe, an epoxy coating is introduced into the stream of compressed gas upstream of the section of pipe to be lined.

18 Claims, 3 Drawing Sheets

SYSTEM AND METHOD FOR RESTORING WATER SUPPLY PIPES IN BUILDINGS

FIELD OF THE INVENTION

The present invention relates to piping systems. In particular, the present invention relates to restoring water supply pipes in buildings.

BACKGROUND OF THE INVENTION

Fluid conduits such as gas pipes, sewer pipes and water pipes are susceptible to the build-up of rust and scale on the inner surface of the pipe. This may be caused by corrosion of the inner pipe surface and/or the deposit of accretions onto the pipe surface, such as lime or other deposits of solids, from fluids moving in the pipe. Over time, rust and scale accumulate inside the pipe, which reduces the volume of flow through the pipe. Corrosion and erosion also deteriorate pipe walls, ultimately causing pits, pinhole leaks and major leaks necessitating replacement of the pipe.

Restoration of existing pipes by pipe lining can extend the useful life of pipes and thus reduce the frequency by which pipes need to be replaced. Pipe lining also takes less time to complete and costs less than replacing pipes. It also does not require holes to be made in walls.

A known method of pipe restoration by pipe lining is to first clean the pipes by draining the pipes, blowing heated compressed air, first by itself to dry the pipes, and then carrying particles of abrasive material through the pipes to dislodge the build-up on the inner surface of the pipe. An epoxy coating is then applied to the interior walls of the pipes by using the heated compressed air to blow epoxy through the pipes. The smooth coat of epoxy fills in pits and pinhole leaks and protects the pipes from corrosion and erosion. If only pipe cleaning is desired, the step of blowing the epoxy through the pipes is omitted.

Where such a method of pipe cleaning or restoration is carried out on the water supply pipes in a building, such as an apartment building, compressed air supply hoses are used to deliver the compressed air to each apartment unit. The hoses are then connected to a pipe in the apartment, such as a hot or cold water pipe in the kitchen, and the compressed air is blown through that branch pipe into the hot or cold water riser to an end of the riser, usually in the basement of the building, where the pipe has been cut open to vent the compressed air carrying the abrasive material and dislodged build-up through a hose and into filter and then into the open air. To deliver the compressed air to each apartment unit, the compressed air supply hoses are typically run from an air compressor on the ground outside of the building to an apartment unit through a window or balcony door in every apartment unit. Alternatively, compressed air supply hoses are run through the staircases of the building and then through the front door of each apartment unit. Either of these alternatives is dangerous as it requires a door or window to the apartment to remain open and unlocked, leaving the tenant or occupant vulnerable to theft or other crime. Furthermore, running air supply hoses to each individual apartment unit is labour-intensive and expensive.

BRIEF DESCRIPTION OF THE DRAWINGS

In drawings which illustrate by way of example only a preferred embodiment of the invention.

DETAILED DESCRIPTION OF THE INVENTION

Figure 1:
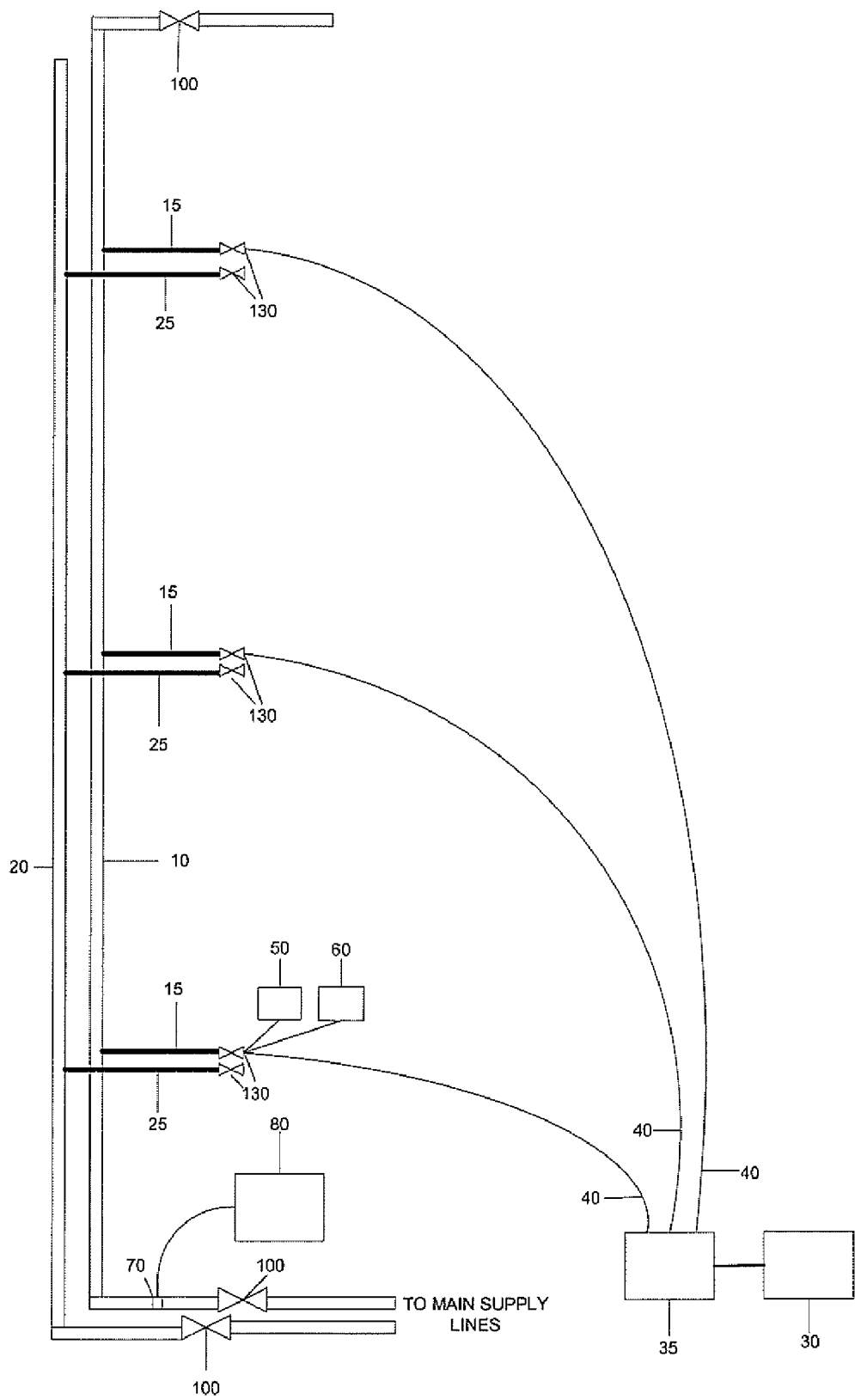
FIG. 1 is a schematic diagram showing a prior art system for cleaning and/or lining a hot water riser in a typical hot and cold water piping system found in a residential apartment building.

The present invention relates to a system and method for restoring water supply pipes in buildings. The present invention can be beneficially employed in various types of buildings, such as high-rise condominium buildings, offices, apartments, hospitals and hotels.

The present invention eliminates the need for running compressed air supply hoses to the pipes in each apartment unit in order to supply the compressed air to clean or restore the hot and cold water pipes.

The present invention relates to a system for cleaning at least a section of a water supply pipe in a building having isolated and dried first and second supply pipes for supplying cold and hot water, comprising: a supply of compressed gas for supplying a stream of compressed gas into an inlet of a first supply pipe at an upstream position along the pipe; a second supply pipe comprising an outlet for venting the compressed gas; a supply of abrasive particles for cleaning an interior of the at least one section of either the second supply pipe or the first supply pipe or both, where the abrasive particles are introduced into the stream of compressed gas upstream of the at least one section of pipe to be cleaned; and an air-impermeable conduit connecting the interior of the first supply pipe to the interior of the second supply pipe such that pressurizing the first supply pipe pressurizes the second supply pipe.

The present invention also relates to a system for lining at least a section of a water supply pipe with an epoxy coating in a building having isolated and dried first and second supply pipes for supplying cold and hot water, comprising: a supply of compressed gas for supplying a stream of compressed gas into an inlet of a first supply pipe at an upstream position along the pipe; a second supply pipe comprising an outlet for venting the compressed gas; a supply of epoxy coating for lining the interior of the at least one section of either the second supply pipe or the first supply pipe or both, where the epoxy coating is introduced into the stream of compressed gas upstream of the at least one section of pipe to be lined; and an air-impermeable conduit connecting the interior of the first supply pipe to the interior of the second supply pipe such that pressurizing the first supply pipe pressurizes the second supply pipe.

The present invention also relates to a method of cleaning at least a section of a water supply pipe in a building having isolated and dried first and second supply pipes for supplying cold and hot water, comprising: pneumatically connecting a first supply pipe to a second supply pipe such that pressurizing the first supply pipe pressurizes the second supply pipe; blowing a stream of compressed gas into an inlet of the first supply pipe, at an upstream position along the pipe; introducing abrasive particles into the stream of compressed gas upstream of the at least one section of pipe to be cleaned; and venting the compressed gas and any dislodged build-up from an outlet of the second supply pipe.

The present invention also relates to a method of lining at least a section of a water supply pipe in a building having isolated and dried first and second supply pipes for supplying cold and hot water, comprising: pneumatically connecting a first supply pipe to a second supply pipe such that pressurizing the first supply pipe pressurizes the second supply pipe; blowing a stream of compressed gas into an inlet of the first supply pipe, at an upstream position along the pipe; introducing an epoxy coating into the stream of compressed gas upstream of the at least one section of pipe to be lined; and venting the compressed gas and any excess epoxy coating from an outlet of the second supply pipe.

FIG. 1 shows a prior art system for cleaning and/or lining a hot water riser in a typical hot and cold water piping system found in a residential apartment building. Hot water riser 10 and cold water riser 20 supply water to occupants on each floor of the building. An air compressor 30 is outside the building and optionally connected to a heater 35 for heating the compressed air. Air supply hoses 40 are run from the heater 35 to each apartment serviced by the hot water riser 10 and cold water riser 20. The air supply hoses 40 enter the apartment unit through a window or balcony door and, to clean the hot water riser 10, are connected to the hot water branch 15 feeding into the hot water riser 10 being cleaning or lined. Alternatively, the air supply hoses 40 are run inside the building through a staircase and hallways to and through the front doors of each apartment unit served by the hot water riser 10 and cold water riser 20.

In the prior art system shown in FIG. 1, a cleaning device for example a device for supplying aluminum oxide, such as aluminum oxide blaster 50, is brought into the apartment unit and is used to supply the aluminum oxide into the compressed air stream prior to it entering into the hot water branch 15 feeding into the hot water riser 10. Similarly, where lining of the pipes is also desired, a coating device such as a device for supplying an epoxy coating 60 for pipe lining is also brought into the apartment unit and is used to supply the epoxy into the compressed air stream prior to it entering the hot water branch 15. The compressed air stream is vented through an outlet 70 in the hot water riser, usually in the basement of the building, through a hose into an air filter 80 to filter out the aluminum oxide, dislodged debris or excess epoxy.

Figure 2:
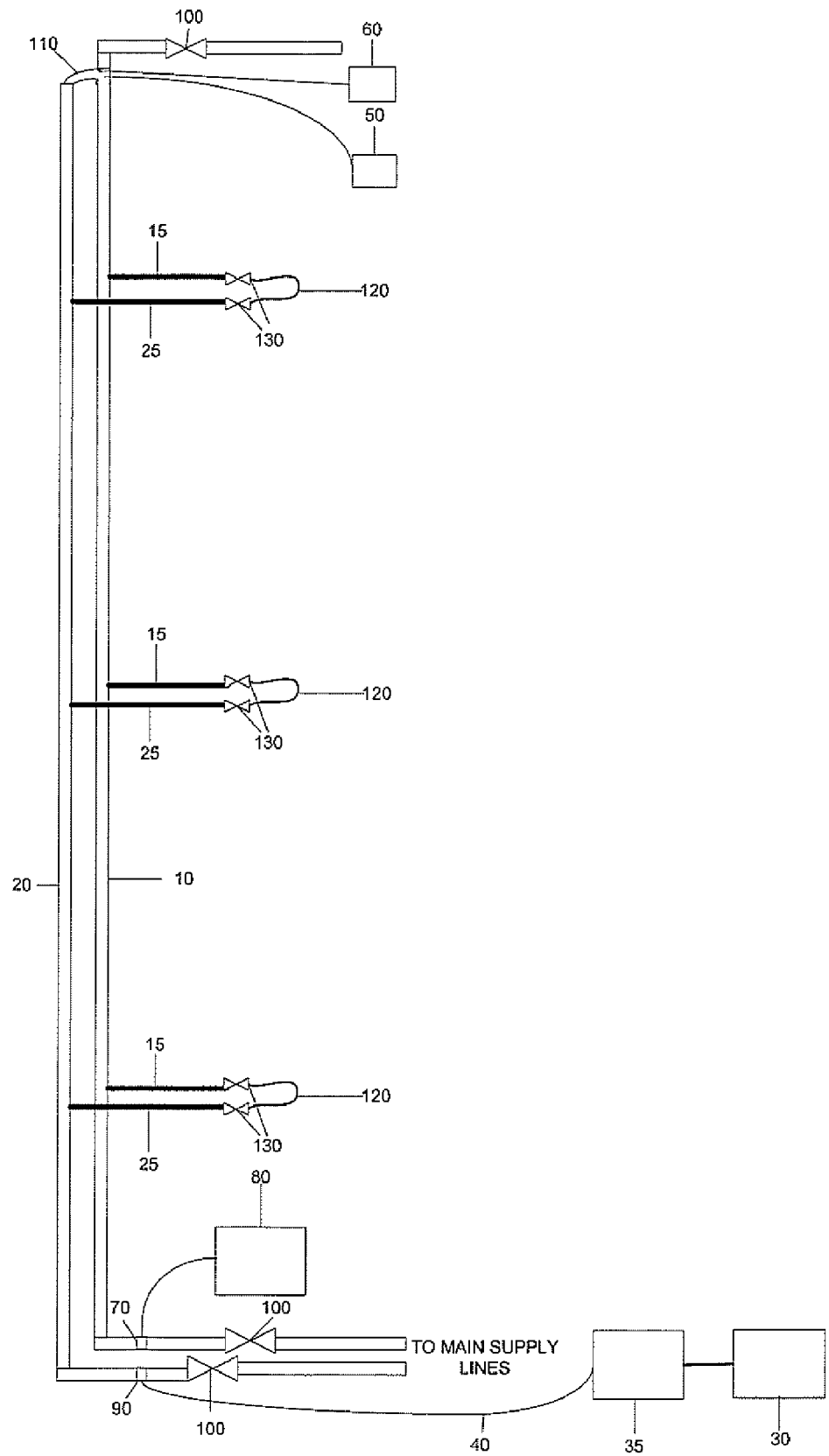
FIG. 2 is a schematic diagram showing a system for cleaning and/or lining hot and cold water supply pipes according to the present invention, as applied to the hot and cold water pipes shown FIG. 1.

FIG. 2 shows a system for cleaning and/or lining hot and cold water supply pipes according to the present invention, as applied to the hot and cold water pipes shown in FIG. 1. In FIG. 2, the air compressor 30 is in the basement of the building and is connected to the optional heater 35 and then to an inlet 90 where the pipe on the cold water riser 20 has been cut on the riser side of isolation valve 100. The cold water riser 20 is used as a conduit to supply compressed air to the hot water riser 10 by connecting the cold water riser 20 to the hot water riser 10 by a pneumatic conduit, such as riser air hose 110. By using the cold water riser 20 to supply compressed air to hot water riser 10, the present invention eliminates the need for multiple compressed air supply hoses 40. Instead the present invention uses only one compressed air supply hose 40. This arrangement of the present invention may considerably reduce labour costs incurred in a pipe cleaning or restoring job, and avoids having to feed air supply hoses into individual units in the building.

Before cleaning and/or lining can be commenced the water flow to the pipes is shut-off at isolation valves 100, and then the pipes are drained and dried. After the draining process is completed, the drying process can be accelerated by supplying a stream of compressed air through the hot and cold water supply pipes, especially when the compressed air is heated by the optional heater 35. Heating the compressed air also accelerates the drying of the epoxy coating when the pipes are being lined. Preferably, the compressed air is heated to a temperature between 20 degrees Celsius and 60 degrees Celsius.

The preferred abrasive material used to clean the pipes is aluminum oxide or corundum, however any suitable abrasive that has been approved for use in pipe cleaning by the applicable regulators, if necessary, may be used. It may also possible to reuse the abrasive captured by air filter 80 a few times if desired.

The preferred epoxy coating is a two-component epoxy (hardener and resin) that has been approved for pipe lining by the applicable regulatory authorities if necessary, such as National Sanitation Foundation (NSF) 61 for pipes of a half-inch or larger in diameter.

The supply of compressed gas is preferably a supply of compressed air, such as an air compressor, although other gases could be used instead of air, including inert gases such as carbon dioxide.

Either hot water supply pipes, such as a hot water riser, or cold water supply pipes, such as a cold water riser, or both, can be cleaned and/or lined according to the present invention. A hot water riser is typically made of copper piping, but may alternatively be made of galvanized steel or iron piping. A hot water riser 10 made of copper piping will erode more quickly than a cold water riser 20 made of copper piping, and therefore the hot water riser 10 is typically more likely to require cleaning and pipe lining. However, the present invention may also be beneficially employed to clean and line cold water pipes. The present invention may be beneficially employed with kitchen and washroom risers as well as other types of risers, such as for heating and cooling systems, and other fluid supply lines.

As shown in FIG. 2, an air-impermeable connection is provided between hot water riser 10 and a cold water riser 20 which allows the cold water riser 20 to be used for supplying compressed air into the hot water riser 10. Preferably, this connection is made at the top, or opposite end of the riser to the supply of compressed air, of the hot water riser 10 and cold water riser 20. The connection is formed by cutting the pipes of the hot water riser 10 and the cold water riser 20 and attaching a pneumatic conduit between the cut-off pipes, such as riser air hose 110 which is of sufficient strength to withstand the force of the stream of compressed air flowing through the cold water riser 20 into the riser air hose 110 and into the hot water riser 10. At this connection is the preferred point for a supply of abrasive particles in the cleaning process, such as aluminum oxide blaster 50, to introduce the abrasive particles into the stream of compressed air, as shown in FIG. 2. Similarly, this is the preferred point for a supply of epoxy coating in the lining process to introduce the epoxy coating into the stream of compressed air, such as by device for supplying an epoxy coating 60, as shown in FIG. 2. This location is preferred as it allows the entire hot water riser 10 be cleaned or lined from top to bottom. Abrasive particles or epoxy coating could be introduced at other points in the piping system, such as may be accomplished by connecting the supply of abrasive particles or the supply of epoxy coating to a hot water branch 15 or a cold water branch 25, either existing or created for cleaning or lining purposes, as long as the branch 15 or 25 connects to the hot water riser 10 or cold water riser 20 upstream of the section of pipe to be cleaned or lined.

After the hot water riser 10 and/or cold water riser 20 has been cleaned or lined, there may be some abrasive material or excess epoxy residing in one or more hot water branches 15 and/or cold water branches 25. As shown in FIG. 2, if necessary the hot water branch 15 and a cold water branch 25 may be connected at the shut-off valves 130 by a pneumatic conduit, such as branch air hose 120, to flow the stream of compressed air through the hot water branch 15 and cold water branch 25 and blow out any abrasive material or excess epoxy from the branches 15 and 25 into the risers 10 and 20 and down to and out the outlet 70. Since the hot water branches 15 and cold water branches 25 are not as heavily used as the hot and cold water risers 10 and 20, they will typically not experience residue build-up, or erode or corrode, as quickly, and do not need to be cleaned or lined as frequently as hot and cold water risers 10 and 20.

Figure 3:
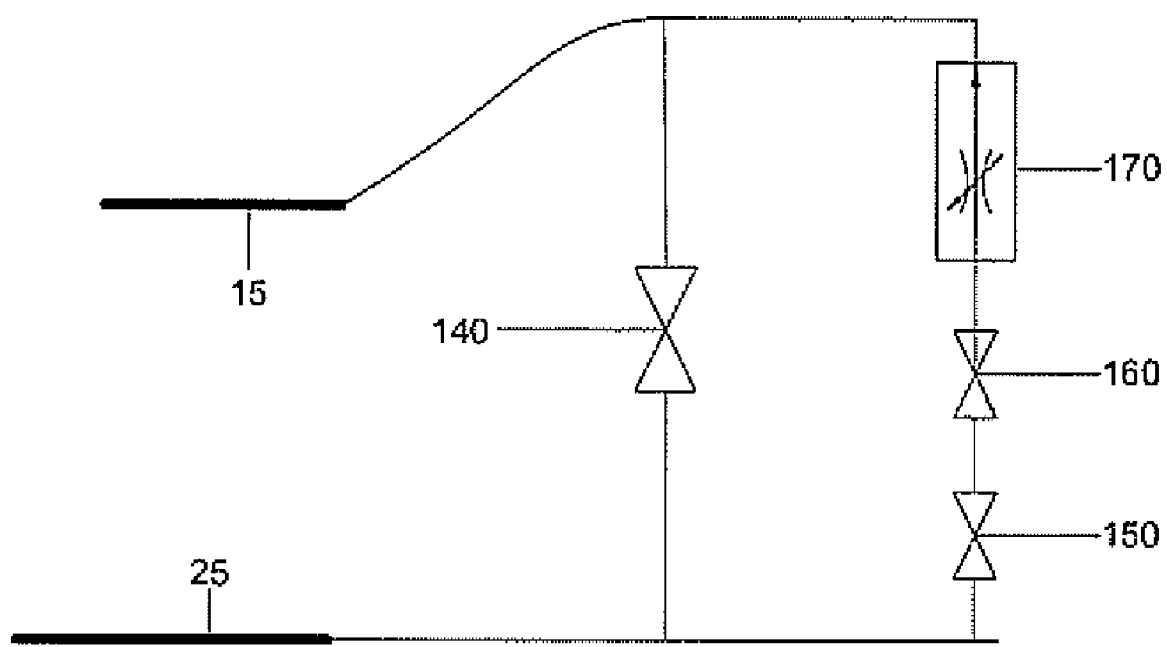
FIG. 3 is a schematic diagram showing an alternative connection between a hot water pipe branch and a cold water pipe branch in a residential apartment unit on hot and cold water risers.

When the interior cross-section of the shut-off valves 130 is too small, connecting a branch air hose 120 between the shut-off valves 130 of the hot water branch 15 and cold water branch 25 will not provide a sufficient flow of compressed gas to blow out all of the abrasive material or excess epoxy in the hot water branch 15 and/or cold water branch 25. In this case, the shut-off valves 130 can be removed and the hot water pipe branch 15 and the cold water pipe branch 25 are preferably connected by an external network of valves shown in FIG. 3. A bypass valve 140 is used to allow the stream of compressed gas from the cold water branch 25 to flow through to the hot water branch 15. A ball valve 150, pressure regulator 160, flow control valve 170 may be used to control the flow and pressure of compressed gas into the hot water branch 15.

In some instances, where the pipe diameter of the riser increases in different sections of the riser, in order to maintain the pressure it is necessary to supplement the supply of compressed air in those increased-diameter sections of the riser by introducing further supplies of compressed air. In those cases, further supplies of compressed air may be introduced on certain floors of the building, as appropriate given the placement of the diameter changes in the riser.

Various embodiments of the present invention having been thus described in detail by way of example, it will be apparent to those skilled in the art that variations and modifications may be made without departing from the invention. The invention includes all such variations and modifications as fall within the scope of the appended claims.

We claim:

1. A system for cleaning at least a section of a water supply pipe riser in a building having a first supply pipe riser including at least one first supply pipe riser outlet and a second supply pipe riser including at least one second supply pipe riser outlet, said second supply pipe riser isolated from said first supply pipe riser, said first supply pipe riser and said second supply pipe riser having previously been emptied and dried, and wherein said at least a section comprises a portion of said second supply pipe riser, said system comprising:
    a supply of compressed gas for supplying a stream of compressed gas into an inlet of said first supply pipe riser;
    an air-impermeable conduit connecting a one of said at least one first supply pipe riser outlets to a corresponding one of said at least one second supply pipe riser outlets such that pressurizing the first supply pipe riser pressurizes the second supply pipe riser;
    a supply of abrasive particles for cleaning an interior of said at least a section, said supply of abrasive particles connected between said inlet and said at least a section.

2. The system of claim 1, wherein the first supply pipe riser is a cold water riser and the second supply pipe riser is a hot water riser.

3. The system of claim 1, wherein the supply of compressed gas is an air compressor and the air-impermeable conduit is an air hose.

4. The system of claim 3, wherein the abrasive particles are aluminum oxide.

5. The system of claim 1, further comprising a heater for heating the compressed gas before supplying into said inlet of said first supply pipe riser.

6. A system for lining at least a section of a water supply pipe riser with an epoxy coating in a building having a first supply pipe riser including at least one first supply pipe riser outlet and a second supply pipe riser including at least one second supply pipe riser outlet, said second supply pipe riser isolated from said first supply pipe riser, said first supply pipe riser and said second supply pipe riser having previously been emptied and dried, and wherein said at least a section comprises a portion of said second supply pipe riser, said system comprising:
    a supply of compressed gas for supplying a stream of compressed gas into an inlet of said first supply pipe riser;
    an air-impermeable conduit connecting a one of said at least one first supply pipe riser outlets to a corresponding one of said at least one second supply pipe riser outlets such that pressurizing the first supply pipe riser pressurizes the second supply pipe riser;
    a supply of epoxy coating for lining the interior of the at least a section, where the epoxy coating is introduced into the stream of compressed gas between said inlet and the at least one section.

7. The system of claim 6, wherein the first supply pipe riser is a cold water riser and the second supply pipe riser is a hot water riser.

8. The system of claim 6, wherein the supply of compressed gas is an air compressor and the air-impermeable conduit is an air hose.

9. The system of claim 6, further comprising a heater for heating the compressed gas before supplying into said inlet of said first supply pipe riser.

10. A method of cleaning at least a section of a water supply pipe riser in a building having a first supply pipe riser including at least one first supply pipe riser outlet and a second supply pipe riser including at least one second supply pipe riser outlet, said second supply pipe riser isolated from said first supply pipe riser, said first supply pipe riser and said second supply pipe riser having previously been emptied and dried, and wherein said at least a section comprises a portion of said second supply pipe riser, said system comprising:
    pneumatically connecting a one of said at least one first supply pipe riser outlets to a corresponding one of said at least one second supply pipe riser outlets such that pressurizing the first supply pipe riser pressurizes the second supply pipe riser;
    blowing a stream of compressed gas into an inlet of the first supply pipe riser;
    introducing abrasive particles into the stream of compressed gas upstream of the at least a section, said supply of abrasive particles connected between said inlet and said at least a section; and
    venting the compressed gas and any dislodged build-up from the second supply pipe riser.

11. The method of claim 10, wherein the first supply pipe riser is a cold water riser and the second supply pipe riser is a hot water riser.

12. The method of claim 11, wherein the at least one second supply pipe riser outlets comprises a plurality of second supply pipe riser outlets, and wherein build-up is dislodged from the second supply pipe riser through a remaining one or more of the plurality of second supply pipe riser outlets.

13. The method of claim 12, wherein the compressed gas is compressed air.

14. The method of claim 13, wherein the abrasive particles are aluminum oxide.

15. A method of lining at least a section of a water supply pipe riser in a building having a first supply pipe riser including at least one first supply pipe riser outlet and a second supply pipe riser including at least one second supply pipe riser outlet, said second supply pipe riser isolated from said first supply pipe riser, said first supply pipe riser and said second supply pipe riser having previously been emptied and dried, and wherein said at least a section comprises a portion of said second supply pipe riser, said system comprising:

pneumatically connecting a one of said at least one first supply pipe riser outlets to a corresponding one of said at least one second supply pipe riser outlets, such that pressurizing the first supply pipe riser pressurizes the second supply pipe riser;

blowing a stream of compressed gas into an inlet of the first supply pipe riser;

introducing an epoxy coating into the stream of compressed gas upstream of the at least a section of pipe; and venting the compressed gas and any excess epoxy coating from the second supply pipe riser.

16. The method of claim 15, wherein the first supply pipe riser is a cold water riser and the second supply pipe riser is a hot water riser.

17. The method of claim 15, wherein the at least one second supply pipe riser outlets comprises a plurality of second supply pipe riser outlets, and wherein said any excess epoxy coating is vented from a remaining one or more of the plurality of second supply pipe riser outlets.

18. The method of claim 17, wherein the compressed gas is compressed air.

\* \* \* \* \*